United States Patent
Delmas

(12) 
(10) Patent No.: US 6,455,022 B1
(45) Date of Patent: Sep. 24, 2002

(54) PURIFICATION OF AQUEOUS ALKALI METAL CHLORIDE SOLUTIONS BY REMOVAL OF AMMONIUM/IODINE VALUES THEREFROM

(75) Inventor: François Delmas, Lyons (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 08/288,433

(22) Filed: Aug. 11, 1994

Related U.S. Application Data

(63) Continuation of application No. 07/895,704, filed on Jun. 9, 1992, now abandoned.

(30) Foreign Application Priority Data

Jun. 10, 1991 (FR) .............................................. 91 07011

(51) Int. Cl.$^7$ .............................. C25B 1/26; C01D 3/04
(52) U.S. Cl. ................................ 423/499.1; 423/499.3; 423/499.4; 423/499.5; 205/618; 205/620
(58) Field of Search .............................. 423/476, 499.1, 423/499.3, 499.4, 499.5, 497; 210/754, 758; 204/98, 128; 205/618, 620, 556

(56) References Cited

U.S. PATENT DOCUMENTS

| | | | | |
|---|---|---|---|---|
| 4,584,071 A | * | 4/1986 | Bissot | 204/98 |
| 5,069,884 A | * | 12/1991 | Filippone et al. | 423/499.4 |

FOREIGN PATENT DOCUMENTS

| | | | |
|---|---|---|---|
| EP | 399588 | 5/1990 | |
| JP | 4-202002 | * 7/1992 | 423/476 |

OTHER PUBLICATIONS

Bailar et al., "Comprehensive Inorganic Chemistry", vol. 2, QD151.2.C6, 1973, pp 1452–1459.*
Kirk Othmer, "Encyclopedia of Chemical Technology", 3$^{rd}$ edition, TP 9 E 68, 1978, pp 649–650.*
J. T. Baker Chemical Co., "Specification Catalog and Price List 620", 1961, p. 206.*
Research Disclosure, K Mason Pub., Emsworth, GB vol. 37 (Nov. 1989), p. 795, J.T. Keating et al: "Treatment of iodide-containing brines for use in membrane chloralkali electrolysis cells".

* cited by examiner

*Primary Examiner*—Ngoc-Yen Nguyen
(74) *Attorney, Agent, or Firm*—Burns, Doane, Swecker & Mathis, L.L.P.

(57) ABSTRACT

Aqueous alkali metal chloride solutions, typically destined for electrolysis for the production of chlorine and containing a contaminating amount of iodine values in other than the periodate state, are purified by oxidizing the iodine values therein to the periodate oxidation state of +7 and then separating such periodate values therefrom. The starting alkali metal chloride solutions may also contain contaminating amounts of ammonium values, which in turn are oxidized, preferably simultaneously, to molecular nitrogen and degassed therefrom.

15 Claims, No Drawings

PURIFICATION OF AQUEOUS ALKALI METAL CHLORIDE SOLUTIONS BY REMOVAL OF AMMONIUM/IODINE VALUES THEREFROM

This application is a continuation of application Ser. No. 07/895,704, filed Jun. 9, 1992 now abandoned.

BACKGROUND OF THE INVENTION

1. Field of the Invention

The present invention relates to the purification of aqueous alkali metal chloride solutions by removal of ammonium and iodine values therefrom, and particularly wherein, simultaneously, the ammonium values are consumed by oxidation to molecular nitrogen, followed by a degassing treatment.

2. Description of the Prior Art

It is known to this art to electrolyze aqueous solutions of sodium chloride to produce chlorine.

When electrolysis is carried out according to the so-called "membrane" technique, it is necessary to carefully purify the starting aqueous solution to remove the normal impurities in sodium chloride, such as calcium, magnesium and sulfates. For example, precipitations by means of sodium carbonate, then absorptions onto resins are employed for such purpose; such methods are described in Ullmann's Encyclopedia Of Industrial Chemistry, Vol. A6, 448 (1986). Depending upon its particular origins, the starting sodium chloride solution can also contain iodine in the iodide state $I^-$.

U.S. Pat. No. 4,483,754 relates that the presence of iodine in an aqueous sodium chloride solution in a membrane technique leads to a rapid degradation of the membranes. According to this '754 patent, the iodine present in the aqueous solution in the iodide form (oxidation state –1) is oxidized to the molecular iodine form (oxidation state 0), then such molecular iodine is removed from the aqueous chloride solution either by absorption onto active charcoal or onto an anionic exchange resin, or by stripping with air in a column. The examples reflect that an aqueous sodium chloride solution containing 0.8 ppm (Example 1) and 0.7 ppm (Example 3), expressed as iodine, can thus be obtained. Thus, such purification to remove iodine values is considered to be sufficient.

EP-0,399,588 describes a technique for purification of an aqueous sodium chloride solution in which iodides are oxidized to molecular iodine which is adsorbed on an ion-exchange resin and then, in a downstream stage, ammonium ions are oxidized to molecular nitrogen which is removed from the solution by stripping with air.

An aqueous sodium chloride solution containing from 0.2 to 0.5 ppm of iodine is thus obtained. It is indeed described in column 2, lines 24–26, that it is advisable to avoid an excessive oxidation resulting in the formation of $IO_3^-$ anions (oxidation state +5).

Published application IRE No. 30,732, dated November 1989, relates that iodine contained in aqueous sodium chloride solutions, in the iodide form, is oxidized to periodate in the cell over the course of electrolysis. This periodate precipitates in the membrane and damages it. According to this '732 publication, barium is added to the solution, prior to electrolysis; there is thus formed a very fine, highly insoluble precipitate of barium periodate.

SUMMARY OF THE INVENTION

It has now been determined that the above solution is not satisfactory when the amount of iodine is significant, because the precipitate has a tendency to accumulate in the membrane and reduces its performance. It is thus necessary, for the technique of membrane electrolysis, to reduce as much as possible the amount of iodine. The aforesaid prior art relating to the elimination of iodine must employ resins therefor.

It has now been found that it is far simpler and more effective to oxidize the iodine to periodate and then to remove such periodate by filtration. An aqueous sodium chloride solution containing at most 0.1 ppm of iodine is thus obtained which can be electrolyzed without damaging the membranes of an electrolytic cell.

Briefly, the present invention features a technique for the purification of an aqueous alkali metal chloride solution containing iodine, comprising oxidizing such iodine values to the oxidation state +7, namely, the periodate form, and then removing the periodate.

DETAILED DESCRIPTION OF THE PREFERRED EMBODIMENTS OF THE INVENTION

More particularly according to the present invention, the oxidation of iodine, namely, of iodide, of iodine or of iodate, is advantageously carried out at any pH with active chlorine. To oxidize by mean of active chlorine, it is sufficient to inject chlorine, chlorine water or hypochlorite, such as household bleach, into the starting solution. It is possible to monitor the oxidation by a measurement of the oxidation/reduction potential. The amount of oxidizing agent must be at least slightly greater than the stoichiometric amount in order to oxidize the iodide to periodate. Indeed, a large excess in relation to this stoichiometry is preferable in order to oxidize other compounds present in the brine and exhibiting a reducing power with regard to the oxidizing agent. This oxidation can be carried out at room temperature, but in order to provide a more rapid reaction, it is preferable to operate at a temperature of at least at 60° C.

The kinetics of oxidation of iodine to periodate are rapid. It is preferable to oxidize at more than 40° C. to increase the speed of formation of a precipitate of iodine in the +7 oxidation state. At 60° C., the desired precipitate is formed after a few minutes. Preferably, from 20 to 90 min are required for proper efficiency.

According to the present invention, iodine is oxidized to the $IO_4^-$ ion form, i.e., the periodate form. To provide the most complete possible precipitation of the periodate, it is preferable for the reaction to be carried out in a basic medium and preferably at a pH of from 11 to 13. The pH can be adjusted by a basic agent such as sodium hydroxide. The addition of the oxidizing agent and the basic agent can be conducted in any order.

It is preferable that the starting aqueous alkali metal chloride solution should contain at least one barium, calcium, strontium or magnesium cation in order to form the periodate. The treatment for purification from iodine is thus carried out on the crude aqueous alkali metal chloride solution, namely, prior to removal of the calcium, magnesium, etc., according to conventional purifications described in the aforesaid Ullmann text. The purification of the invention can also be carried out after the conventional purifications from calcium or magnesium, provided that these treatments have been conducted using barium carbonate. Barium cations thus remain in the aqueous alkali metal chloride solution. The removal of the periodate can be effected by a simple filtration, a decantation, or any equivalent means or any combination thereof.

After the treatment of the invention, and if the aqueous alkali metal chloride solution has to be transported over resins or any material sensitive to active chlorine, it is advisable to destroy the possible excess of oxidizing agent. Such destruction or consumption of active agent is per se known to this art For example, $SO_2$ can be used therefor.

The present invention also features a method in which ammonium is removed in addition to iodine. Thus, the starting aqueous solution may also contain ammonium cations. It is desirable to remove dissolved ammonium to avoid the formation of $NCl_3$, an unstable compound which can decompose violently. The ammonium values are oxidized to molecular nitrogen and then the nitrogen is removed by degassing by placing the solution under vacuum, or by stripping it in a column with an inert gas or with air. This oxidation is also per se known to this art, and is carried out at a pH less than 10 and preferably ranging from 6 to 10. In a preferred embodiment of the invention, the oxidation of the ammonium and iodine is carried out simultaneously. It suffices that this be under pH conditions for the oxidation of ammonium since these are the most limiting.

It is advantageous to use a single oxidizing agent for the iodine and ammonium values. Preferably, active chlorine is employed therefor.

The amount of active chlorine used to destroy/consume the ammonium is advantageously greater than the stoichiometric amount required and preferably ranges from 1.5 to 2.5 times the stoichiometric amount. Downstream, the nitrogen is degassed and then the pH is adjusted by addition of a basic agent, for example sodium hydroxide, to effect the precipitation of periodate; the operation is then conducted as described above.

In order to further illustrate the present invention and the advantages thereof, the following specific examples are given, it being understood that same are intended only as illustrative and in nowise limitative.

EXAMPLE 1

A brine containing 300 g/l of NaCl also included:
(i) 20 mg/l of Mg,
(ii) 1.2 g/l of Ca,
(iii) 0.12 mg/l of Ba,
(iv) 0.7 mg/l of iodine 4 $cm^3$ of 12.5% chlorine bleach were added to 200 $cm^3$ of brine of pH 12; the resulting solution was then stirred for 2 hours at room temperature.

After filtration on a Millipore filter (0.22 $\mu$m), the iodine content was no greater than 0.5 ppm.

EXAMPLE 2

The procedure of Example 1 was repeated, except that the treatment was carried out at 60° C.

The final iodine content was 0.1 mg/l.

EXAMPLE 3

A brine having the same composition as in Example 1 was doped to 1.9 mg/l, expressed as iodine values. After treatment at 60° C. for 1 hour at pH =12.5, the iodine content of the filtrate was 0.1 mg/l.

EXAMPLE 4

A brine of 300 g/l of the same composition as in Example 1 was doped to 24 mg/l as $NH_3$. 4 $cm^3$ of 12.5% bleach introduced into 200 $cm^3$ of brine and the pH was adjusted to 10. After 1/4 hour of stirring at 60° C., the solution was rendered basic and maintained at pH =12 for 1 hour.

After filtering, the brine now contained only 0.1 mg/l of iodine and the ammoniacal nitrogen had been 100% destroyed/consumed.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the purification of an aqueous alkali metal chloride solution containing a contaminating amount of iodine in other than the periodate state, comprising (a) oxidizing the iodine therein to the periodate oxidation state of +7 by introduction of an effective oxidizing amount of an oxidizing agent and (b) then separating the periodate therefrom, and further comprising consuming excess oxidizing agent.

2. The process as defined by claim 1, wherein said oxidizing agent in (a) comprises an active chlorine compound, which active chlorine compound is chlorine, chlorine water or hypochlorite.

3. The process as defined by claim 2, wherein (a) comprises oxidizing said iodine with a hypochlorite.

4. The process as defined by claim 2, wherein (a) comprises oxidizing said iodine with more than stoichiometric amount of said active chlorine compound.

5. The process as defined by claim 1, wherein (b) comprises separating said periodate via precipitation thereof.

6. The process as defined by claim 5, comprising precipitating said periodate in a basic medium of precipitation.

7. The process as defined by claim 6, said basic medium having a pH ranging from about 11 to 13.

8. The process as defined by claim 7, wherein said aqueous alkali metal chloride solution further comprises a contaminating amount of ammonium and wherein (a) further comprises a contaminating amount of ammonium and wherein (a) further comprises simultaneously oxidizing said ammonium to molecular nitrogen.

9. The process as defined by claim 8, comprising simultaneously oxidizing said ammonium with an active chlorine compound which active chlorine compound is chlorine, chlorine water or hypochlorite.

10. The process as defined by claim 9, comprising simultaneously oxidizing said ammonium with a hypochlorite.

11. The process as defined by claim 8, further comprising degassing molecular nitrogen from said solution.

12. The process as defined by claim 1, said resulting aqueous solution comprising at most 0.1 ppm of iodine.

13. The process as defined by claim 1, said aqueous alkali metal chloride starting solution comprising barium, calcium, strontium or magnesium cations, or combination thereof.

14. The process as defined by claim 1, further comprising electrolyzing the resulting aqueous solution so as to produce chlorine.

15. The process as defined by claim 14, wherein steps (a) and (b) of the process occur prior to introduction of the resulting aqueous solution into an electrolytic cell from step (c).

* * * * *